May 8, 1956    F. F. COOK ET AL    2,744,458
BRAKE AND INDEXING MEANS FOR PRINTING MACHINES
Filed April 25, 1952    4 Sheets-Sheet 1

Inventors
Francis Frederick Cook &
John Eric Spriggs

May 8, 1956　　　F. F. COOK ET AL　　　2,744,458
BRAKE AND INDEXING MEANS FOR PRINTING MACHINES
Filed April 25, 1952　　　　　　　　　　　　4 Sheets-Sheet 4

Inventors
Francis Frederick Cook &
John Eric Spriggs

United States Patent Office 2,744,458
Patented May 8, 1956

2,744,458

BRAKE AND INDEXING MEANS FOR PRINTING MACHINES

Francis Frederick Cook, Bramber, Steyning, and John Eric Spriggs, London, England, assignors to Pictorial Machinery Limited, London, England, a British company Application April 25, 1952, Serial No. 284,428

Claims priority, application Great Britain April 27, 1951

5 Claims. (Cl. 95—73)

This invention relates to a direct mechanical negative printing machine of the type provided with a bed that supports a photo-lithographic plate over which is traversed a carriage bearing equipment for making exposures of a negative at different parts of the plate surface.

The main object of the invention is to provide improved means for setting the carriage at different positions.

According to the main feature of the present invention there is provided a direct mechanical negative printing machine of the type described, which incorporates a braking device for holding the carriage at its set position on the bed comprising in combination a stationary brake track extending in parallel to the path of the carriage, and a brake mechanism fixed to the carriage for movement therewith, said brake mechanism incorporating a braking element mounted for sliding movement on the track, and operating means for bringing and releasably holding the braking element in gripping contact with the track so as to brake the carriage against movement.

In the preferred form, the brake track is in the form of a rigid bar, which may be a round-section rod; the braking element is in the form of a collar mounted on the track bar or rod. The operating means incorporates a screw threaded into a guide for applying a thrust to the braking element in a direction normal to the surface of the brake track.

To prevent the bar from flexing under the braking thrust, it is preferred to provide the brake mechanism with means adjacent the braking element for supporting the bar. Thus, in one construction, the support means comprises a two-legged fork member having bearings in its two limbs for slidably receiving the track rod or bar, the braking element being located between the limbs of the fork.

On the operating screw may be mounted an operating handle to turn with the screw and also to swivel on the screw for moving a stop on the carriage to a reelase position.

One construction of braking device in accordance with the present invention will now be described by way of example with reference to the accompanying drawings, in which.

Figure 1:
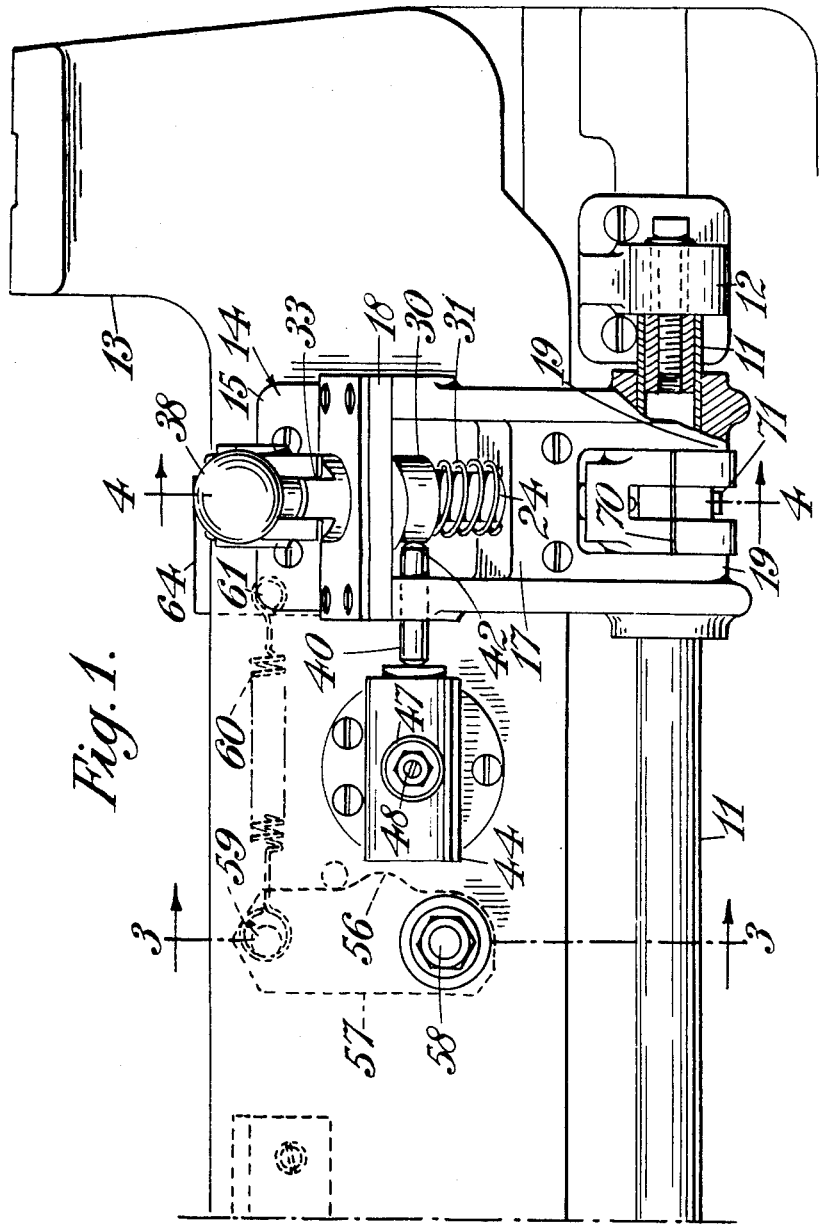
Figure 1 is a side elevation of the device.

At one side of the machine bed 10 is fixed a rigid tubular round-section rod 11 mounted in end brackets 12 (only one is shown) on the bed with its axis parallel to the travel of the carriage 13. The rod 11 serves as a brake track.

At that side of the carriage adjacent the tubular track rod 11 is fitted a braking mechanism carried by a bracket 14 fixed to the carriage. This bracket incorporates a back plate 15 secured by socket head screws 16 to the carriage, a two-legged forked lower portion 17, and an upper bridge portion 18 disposed over the fork 17. Between two cheek plates 19 forming the legs of the fork 17 is fitted a braking slipper in the form of a collar 20 that is mounted on the track rod. The collar is lined with an eccentric bush 21 (Figure 4), which is capable of rotary adjustment about the track rod, for a purpose to be described later. The bush is drilled with tommy holes 22 for receiving a tommy bar. The bottom of the collar is cut away at 23 so as to expose the lower portion of the bush 21 and thereby enable a tommy bar to be placed in position within one of the holes 22. The collar is split radially at 70 and clamped to the bush by a clamping screw 71.

Figure 4:
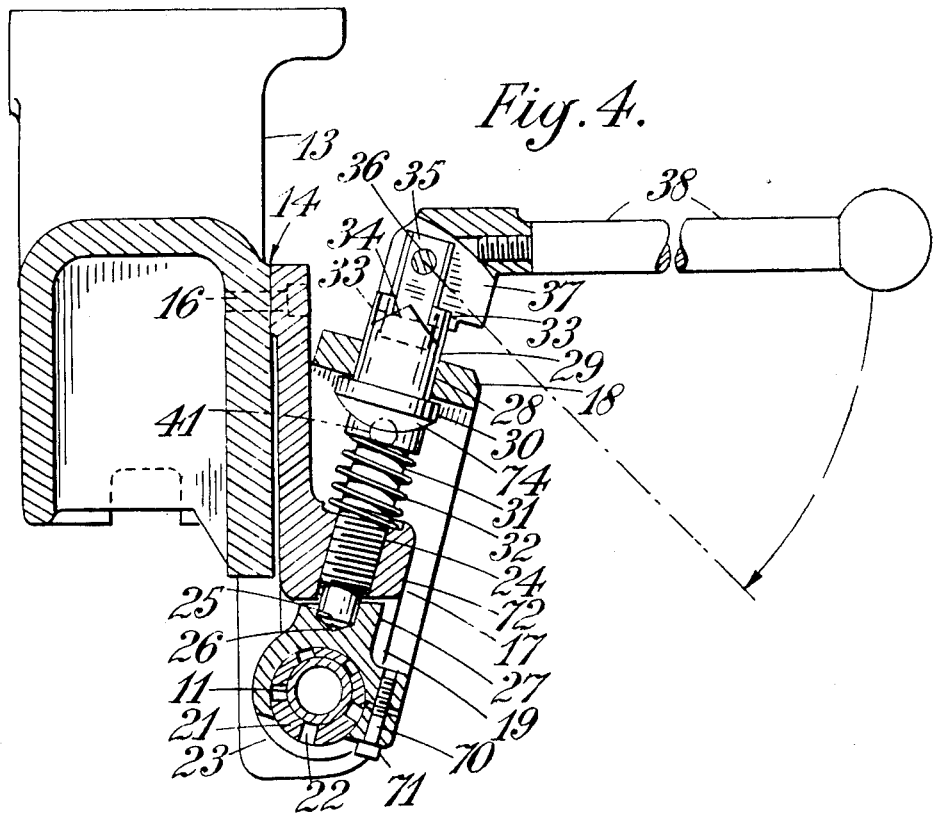
Figure 4 is a cross section on the line 4—4 of Figure 1.

Threaded into a guide formed by a bridge 72 that connects the legs of the fork 17 is the lower end of a screw 24 formed with a tapered end 25 that engages in a rotary seating 26 in a boss 27 at the top of the collar. The upper portion of the screw 24 projects through a hole 28 in the bridge 18 on the bracket. At this position the screw carries a sleeve 29 that has a bearing in the bridge hole 28. The sleeve is formed with an eccentric rotary cam which has a domed cam undersurface 74 and which is located immediately under the bridge. The cam with its sleeve is capable of limited up-and-down movement on a plain portion 31 of the screw. A coil spring 32 on the screw acts resiliently to hold the cam in a raised position (as shown in Figure 4). The upper end of the cam sleeve is shaped with two opposed tongues 33 of rectangular shape separated by two wedge shaped cams 34.

The upper end of the screw is formed with two flats 35. This flatted portion carries a transverse pin 36 on which is pivoted a forked boss 37 fitted with a handle 38. The inside faces of the cheek plates on the boss 37 fit closely against the flats 35 on the upper end of the screw. In this way the handle can be swung horizontally so as to turn the operating screw about its axis (see arrow Figure 2), and also swivelled up or down (see arrows Figures 3 and 4).

The lower edges of the cheeks on the handle boss 37 are formed with V-shaped notches 39 (Figure 3) that engage over the peaked portions of the wedge shaped cams 34 on the cam sleeve 29. When the handle is pulled down from a horizontal position, as shown by chain lines in Figures 3 and 4, the sloping faces of the notches 39 in the handle boss bear upon the co-acting faces of the wedge cams 33, and thereby push the cam sleeve 29 downwardly on the operating screw 24 against the action of the coil spring 32.

Figure 2:
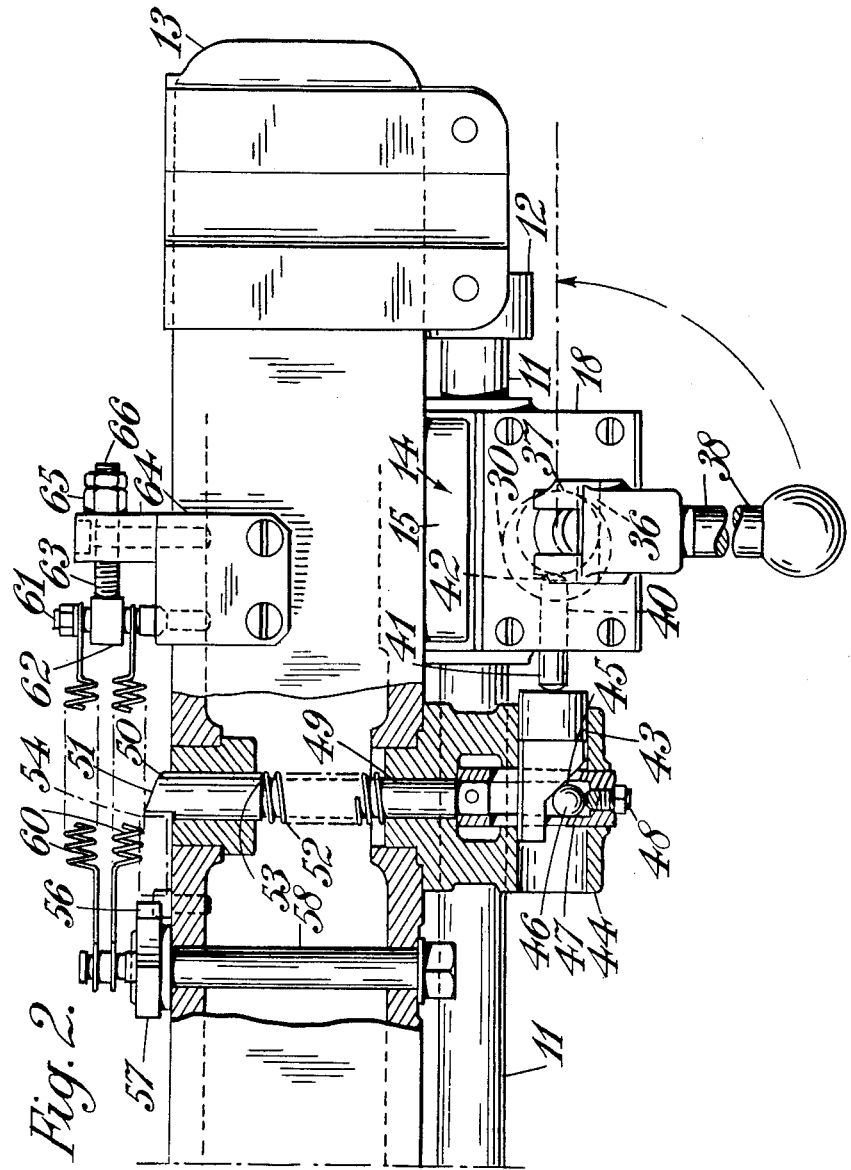
Figure 2 is a plan view, partially sectioned, of the device.
Figure 3:
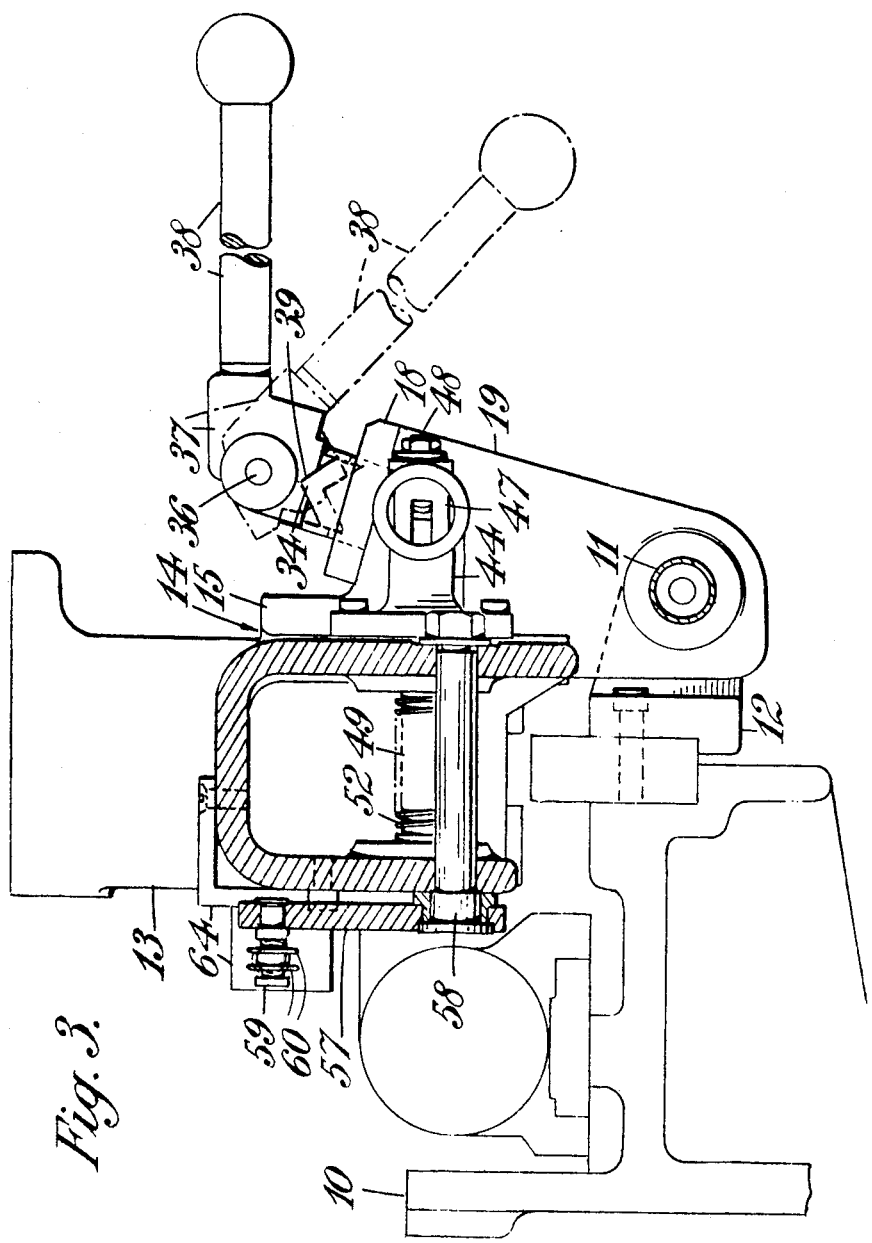
Figure 3 is a cross section on the line 3—3 of Figure 1.

The operation is such that the carriage is unbraked and free to slide when the handle 38 is in the horizontal position along the side of the carriage (chain lines, Figure 2). When the handle is pulled round through 90° (full lines, Figure 2), the turning movement imparted to the operating screw acts to screw it further into its guide 72 and thereby to push the collar 20 hard down upon the track rod. In this way the collar is frictionally gripped on the track rod so as to brake the carriage against movement. The fork 17 holds the track rod rigidly against bending under the pressure. The brake setting can be readily adjusted by turning the eccentric slipper bush 21.

At one side of the bracket 14 is a guide 40 for a lateral thrust pin 41 whose inner end 42 bears under the domed portion of the cam 30 when the operating handle 38 is in a horizontal position (Figure 4). The outer end of the thrust pin bears against one end of a cam slide 43 slidably engaged in a fitting 44 secured to the carriage. The other end of the cam slide has an oblique cam face 45 that bears upon a steel ball 46 within an elongated ball housing 47. The position of the ball along its housing can be adjusted by a set screw 48. The ball housing is set transversely to the cam slide; and it is fixed on one end of a spring loaded plunger 49, whose other end 50 projects beyond the carriage and serves as a carriage stop. The end face of this carriage stop is bevelled at 51. A coil spring 52 mounted on the plunger 49 and engaging under a shoulder 53 thereon acts resiliently to hold the ball 46 in contact with the cam face 45.

The carriage stop 50 is adapted to bear laterally against an adjustable limit stop 54. This limit stop can be preset by any suitable means while an exposure is being taken in preparation for movement of the carriage to a new position for a further exposure. When the carriage stop 50 is in engagement with the limit stop 54, the limit stop is located between the carriage stop and a peaked portion 56 of a lever 57 pivoted at one end on a bolt 58 fitted to the carriage. At the free end of the lever is a stud 59 to which are fitted ends of two coil tension springs 60. The other ends of these springs are fitted to the ends of a transverse pin 61 in the head 62 of an adjustment screw 63 axially adjustable in a hole of a bracket 64 mounted on the carriage. On the end of the screw 63 is threaded an adjustment nut 65 and lock unit 66 for adjusting the axial position of the screw, and thereby the tension of the springs 60.

When the carriage 13 is braked during an exposure, and it is desired to move the limit stop 54 to a new position in preparation for movement of the carriage to its next exposure position, the handle 38 is pushed down (arrows Figures 3 and 4) while in the braking position. As a result, the cam 30 on the operating screw moves down so as to move the thrust pin 40 outwardly. The thrust pin in turn shifts the cam 43, and the ball 46 is then caused to ride over the cam face 45, so pulling on the plunger 49 against the spring 52 and thereby withdrawing the carriage stop 50 clear of the limit stop 54. The limit stop can then be shifted to its new position. When the carriage is eventually moved towards its new position, the oblique end face 51 of the carriage stop 50 is depressed by the limit stop, and the limit stop then comes against the peak 56 of the locating lever 57. The springs 60 acting on the locating lever 57 afford a cushioning effect between the locating lever and the limit stop. The springs also act to pull the carriage stop against the limit stop through the locating lever. A stop 67 on the carriage limits movement of the lever towards the spring-supporting bracket 64.

The arrangement is such that the carriage must first be braked after location on stop limit 54 before the lever can be depressed to withdraw plunger 49 and its associated stop 50.

We claim:

1. A step-and-repeat photographic printing machine comprising in combination a bed for supporting a photolithographic plate, a carriage for carrying equipment for making exposures of a negative successively at a plurality of predetermined positions on the plate, said carriage being guided for linear movement over said bed, a brake track extending in the direction of the said movement, brake means carried by said carriage and operable to cooperate with said brake track to brake the carriage against movement, said brake means comprising a brake element slidably mounted on said track, a screw for urging said brake element against said brake track, and an operating lever extending radially from said screw to permit manual rotation thereof, a retractable plunger carried by said carriage and movable between a projecting position in which it projects therefrom transverse to the direction of movement of the carriage and a retracted position, first spring means urging said plunger towards its projecting position, stop means releasably secured to said bed in the path of said plunger when said plunger is in its projecting position, said stop means being adjustable along the bed in the direction of movement of the carriage, whereby said carriage may be located by abutment of the plunger against the stop means, at a position determined by the position of said stop means, a connection between said plunger and lever for controlling movement of said plunger between its projecting and retracted positions, which connection comprises a sleeve eccentrically and slidably mounted on said screw for rotation with said screw, a flange forming the lower end of said sleeve, a portion of the undersurface of which flange is part-hemispherical, second spring means urging said sleeve towards and against said lever, said lever being mounted on said screw for pivotal movement about an axis substantially perpendicular to the screw axis, whereby said pivotal movement of the lever causes axial movement of said sleeve along said screw, a thrust-link guided for movement in a direction substantially perpendicular to the screw axis, one end of said thrust-link abutting against the undersurface of said flange whereby axial movement of said sleeve as aforesaid causes movement of said thrust-link, the extent of such movement of the thrust-link being determined by the angular setting of said eccentrically mounted sleeve, said extent of movement being a maximum when said sleeve occupies the angular setting in which said brake element is urged against said brake track by said screw, a cam surface constituted by the other end of said thrust-link, a cam follower secured to said plunger and cooperating with said cam surface, whereby movement of said thrust-link causes movement of said plunger from its projecting position towards its retracted position against the bias of the said first spring means, said plunger being withdrawn into its retracted position only when said extent of movement of the thrust-link is a maximum.

2. A step-and-repeat photographic printing machine comprising in combination a bed for supporting a photolithographic plate, a carriage for carrying equipment for making exposures of a negative successively at a plurality of predetermined positions on the plate, said carriage being guided for linear movement over said bed, a brake track in the form of a member of circular cross-section extending in the direction of the said movement, brake means carried by said carriage and operable to cooperate with said brake track to brake the carriage against movement, said brake means comprising a brake element surrounding said brake track, an eccentric bush slidable on said track, said eccentric bush lining said brake element and rotatably adjustable therein, a threaded guide on said carriage, a screw extending through said guide and abutting against said brake element, a lever extending radially from said screw to permit manual rotation thereof, whereby said brake element may be urged towards said brake track, the angular setting of said screw and lever at which said brake means brake said carriage being adjustably determined by the position of rotational adjustment of said eccentric bush in said brake element, a retractable plunger carried by said carriage and movable between a projecting position in which it projects therefrom transverse to the direction of movement of the carriage and a retracted position, stop means releasably secured to said bed in the path of said plunger when said plunger is in its projecting position, said stop means being adjustable along the bed in the direction of movement of the carriage, whereby said carriage may be located, by adjustment of the plunger against the stop means, at a position determined by the position of said stop means, an operative connection between said plunger and lever for controlling movement of said plunger between its projecting and retracted positions, which connection comprises a mutually cooperating cam means and cam follower operatively associated with said lever, said lever being mounted on said screw means for pivotal movement about an axis substantially perpendicular to the screw axis, said cam and cam follower being moved relatively into operative cooperation as aforesaid by movement of said lever to brake the carriage, whereby said plunger can be retracted to permit adjustment of the position of the stop means, only when the carriage is braked.

3. A step-and-repeat photographic printing machine comprising in combination a bed for supporting a photo-lithographic plate, a carriage for carrying equipment for making exposures of a negative successively at a plurality of predetermined positions on the plate, said carriage being guided for linear movement over said bed, a brake track in the form of a member of circular cross-section extending in the direction of the said movement, brake means carried by said carriage and operable to cooperate with said brake track to brake the carriage against movement, said brake means comprising a brake element surrounding said brake track, an eccentric bush slidable on said track, said eccentric bush lining said brake element and rotatably adjustable therein, a threaded guide on said carriage, a screw extending through said guide and abutting against said brake element, a lever extending radially from said screw to permit manual rotation thereof, whereby said brake element may be urged towards said brake track, the angular setting of said screw and lever at which said brake means brake said carriage being adjustably determined by the position of rotational adjustment of said eccentric bush in said brake element, a retractable plunger carried by said carriage and movable between a projecting position in which it projects therefrom transverse to the direction of movement of the carriage and a retracted position, stop means releasably secured to said bed in the path of said plunger when said plunger is in its projecting position, said stop means being adjustable along the bed in the direction of movement of the carriage, whereby said carriage may be located by adjustment of the plunger against the stop means, at a position determined by the position of said stop means, an operative connection between said plunger and lever for controlling movement of said plunger between its projecting and retracted positions, which connection comprises a sleeve eccentrically and slidably mounted on said screw for rotation with said screw, a flange forming the lower end of said sleeve, a portion of the undersurface of which flange is part-hemispherical, second spring means urging said sleeve towards and against said lever, said lever being mounted on said screw for pivotal movement about an axis substantially perpendicular to the screw axis, whereby said pivotal movement of the lever causes axial movement of said sleeve along said screw, a thrust-link guided for movement in a direction substantially perpendicular to the screw axis, one end of said thrust-link abutting against the undersurface of said flange whereby axial movement of said sleeve as aforesaid causes movement of said thrust-link, the extent of such movement of the thrust-link being determined by the angular setting of said eccentrically mounted sleeve, said extent of movement being a maximum when said sleeve occupies the angular setting in which said brake element is urged against said brake track by said screw, a cam surface constituted by the other end of said thrust-link, a cam follower secured to said plunger and cooperating with said cam surface, whereby movement of said thrust-link causes movement of said plunger from its projecting position towards its retracted position against the bias of the said first spring means, said plunger being withdrawn into its retracted position only when said extent of movement of the thrust-link is a maximum.

4. A step-and-repeat photographic printing machine comprising in combination a bed for supporting a photo-lithographic plate, a carriage for carrying equipment for making exposures of a negative successively at a plurality of predetermined positions on the plate, said carriage being guided for linear movement over said bed, a brake track extending in the direction of the said movement, brake means carried by said carriage and operable to cooperate with said brake track to brake the carriage against movement, said brake means comprising a brake element, a screw for urging said brake element against said brake track, and an operating lever extending radially from said screw to permit manual rotation thereof, said lever being mounted on said screw for pivotal movement about an axis substantially perpendicular to the screw axis, a retractable plunger carried by said carriage and movable between a projecting position in which it projects therefrom transverse to the direction of movement of the carriage and a retracted position, stop means releasably secured to said bed in the path of said plunger when said plunger is in its projecting position, said stop means being adjustable along the bed in the direction of movement of the carriage, whereby said carriage may be located by abutment of the plunger against the stop means, at a position determined by the position of said stop means, a connection between said plunger and lever for controlling movement of said plunger between its projecting and retracted positions which connection includes a mutually cooperating cam means and cam follower, said connection being operative to retract the plunger when the lever and screw are in the angular position which they assume when the carriage is braked as aforesaid, whereby such plunger can be retracted, to permit adjustment of the position of the stop means only when the carriage is braked.

5. A direct mechanical negative printing machine in which a bed supports a photolithographic plate and a carriage bearing equipment for making exposures of a negative at different parts of the plate surface is arranged to be traversed over the photolithographic plate, and a brake track extends parallel to the traverse of the carriage, a positioning-and-securing mechanism mounted on the carriage, said positioning-and-securing mechanism comprising a plunger projecting outwardly from the carriage and adapted to engage against a stop member adjustably secured to the bed at a predetermined position, thereby to locate the carriage accurately relatively to the stop member, operating means for withdrawing the plunger out of engagement with the said stop member, a braking element slidably mounted on the track operating means for bringing and releasably holding the braking element in gripping contact with the track so as to brake the carriage against movement, said braking element operating means including a mechanical connection with said plunger operating means for permitting said plunger operating means to withdraw said plunger only when said braking element is releasably held in gripping contact with the track.

References Cited in the file of this patent

UNITED STATES PATENTS

| | | |
|---|---|---|
| 1,714,589 | Chouinard | May 28, 1929 |
| 1,750,294 | Bassist | Mar. 11, 1930 |
| 2,129,767 | Huebner | Sept. 13, 1938 |
| 2,170,895 | Henderson | Aug. 29, 1939 |
| 2,441,687 | Crockett | May 18, 1948 |
| 2,601,804 | Nineberg | July 1, 1952 |